(12) United States Patent
Shibayama et al.

(10) Patent No.: US 11,410,807 B2
(45) Date of Patent: Aug. 9, 2022

(54) FERRITE COMPOSITION AND MULTILAYER ELECTRONIC COMPONENT

(71) Applicant: TDK CORPORATION, Tokyo (JP)

(72) Inventors: Takeshi Shibayama, Tokyo (JP); Takashi Suzuki, Tokyo (JP); Yukio Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 436 days.

(21) Appl. No.: 16/750,434

(22) Filed: Jan. 23, 2020

(65) Prior Publication Data
US 2020/0258668 A1 Aug. 13, 2020

(30) Foreign Application Priority Data

Jan. 29, 2019 (JP) .............................. JP2019-013181
Jan. 9, 2020 (JP) .............................. JP2020-002180

(51) Int. Cl.
*H01F 1/34* (2006.01)
*C04B 35/26* (2006.01)
*H01F 17/00* (2006.01)
*H01F 27/255* (2006.01)

(52) U.S. Cl.
CPC ........... *H01F 1/346* (2013.01); *C04B 35/265* (2013.01); *H01F 1/344* (2013.01); *H01F 17/0013* (2013.01); *H01F 27/255* (2013.01); *C04B 2235/3274* (2013.01); *C04B 2235/3418* (2013.01); *C04B 2235/3427* (2013.01); *C04B 2235/763* (2013.01); *C04B 2235/80* (2013.01); *C04B 2235/83* (2013.01); *C04B 2235/85* (2013.01)

(58) Field of Classification Search
CPC . H01F 1/11; H01F 1/10; C04B 35/265; C04B 2235/3274; C04B 2235/3418; C04B 2235/3427; C04B 2235/763; C04B 2235/80; C04B 2235/83; C04B 2235/85
See application file for complete search history.

(56) References Cited

U.S. PATENT DOCUMENTS

| | | | |
|---|---|---|---|
| 2005/0199852 A1 | 9/2005 | Takenoshita | |
| 2010/0163779 A1* | 7/2010 | Okano | C04B 35/6342 252/62.56 |
| 2015/0097137 A1 | 4/2015 | Wada et al. | |
| 2016/0293302 A1 | 10/2016 | Kakuda et al. | |
| 2019/0371503 A1* | 12/2019 | Sugii | H01F 1/344 |

FOREIGN PATENT DOCUMENTS

| | | |
|---|---|---|
| JP | 2013-060332 A | 4/2013 |
| JP | 5582279 B2 | 9/2014 |

* cited by examiner

*Primary Examiner* — C Melissa Koslow
(74) *Attorney, Agent, or Firm* — Oliff PLC

(57) ABSTRACT

A ferrite composition includes main-phase particles, first sub-phase particles, second sub-phase particles, and a grain boundary. At least 10% or more of the main-phase particles contain a portion whose Zn concentrations monotonously decrease from a particle surface toward a particle central part along a length of 50 nm or more. The first sub-phase particles contain $Zn_2SiO_4$. The second sub-phase particles contain $SiO_2$. A total area ratio of the first sub-phase particles and the second sub-phase particles is 30.5% or more.

9 Claims, 12 Drawing Sheets

FERRITE COMPOSITION AND MULTILAYER ELECTRONIC COMPONENT

BACKGROUND OF THE INVENTION

The present invention relates to a ferrite composition and a multilayer electronic component.

To improve communication distance and sensitivity, electric current flowing through the NFC circuit of ICT equipment is becoming larger. Then, noise removal products for the large current are demanded.

Examples of the noise removal products include winding-wire type ferrite inductors and multilayer type ferrite inductors. In use environment of large current as mentioned above, winding-wire type ferrite inductors are employed in view of height in noise removal characteristics. However, noise removal characteristics equal to or greater than those of winding-wire type ferrite inductors are also demanded for multilayer type ferrite inductors.

Patent Document 1 and Patent Document 2 disclose a ferrite composition having excellent characteristics by controlling its composition and a multilayer electronic component.

Patent Document 1: JP5582279 (B2)
Patent Document 2: JP2013060332 (A)

BRIEF SUMMARY OF INVENTION

However, a ferrite composition and a multilayer electronic component having more excellent characteristics are now demanded.

The present invention has been achieved under such circumstances. It is an object of the invention to provide a ferrite composition or so having improved DC superposition characteristics and AC resistance.

To achieve the above object, a ferrite composition according to the first aspect of the present invention includes main-phase particles composed of spinel ferrite, first sub-phase particles, second sub-phase particles, and a grain boundary, wherein at least 10% or more of the main-phase particles contain a portion whose Zn concentrations monotonously decrease from a particle surface toward a particle central part along a length of 50 nm or more, the first sub-phase particles contain $Zn_2SiO_4$, the second sub-phase particles contain $SiO_2$, and a total area ratio of the first sub-phase particles and the second sub-phase particles is 30.5% or more.

An average of A2/A1 may be 1.10 or more, where A1 and A2 are respectively a minimum value and a maximum value of Zn concentrations of the portion in each of the main-phase particles.

A ferrite composition according to the second aspect of the present invention includes main-phase particles composed of spinel ferrite, first sub-phase particles, second sub-phase particles, and a grain boundary, wherein at least 10% or more of the main-phase particles are composed of a core part and a shell part whose Zn concentration is higher than that of the core part, the first sub-phase particles contain $Zn_2SiO_4$, the second sub-phase particles contain $SiO_2$, and a total area ratio of the first sub-phase particles and the second sub-phase particles is 30.5% or more.

The ferrite composition according to the present invention has the above features and can thereby improve DC superposition characteristics and reduce AC resistance.

The following matters are common between the ferrite composition according to the first aspect and the ferrite composition according to the second aspect.

The grain boundary may contain $SiO_2$.

The ferrite composition according to the present invention may include a main component and a sub-component, wherein the main component includes 10.0 to 50.0 mol % of a Fe compound in terms of $Fe_2O_3$, 3.0 to 14.0 mol % of a Cu compound in terms of CuO, 10.0 to 80.0 mol % of a Zn compound in terms of ZnO, and a balance of a Ni compound, and the sub-component includes 3.0 to 25.0 parts by weight of a Si compound in terms of $SiO_2$ with respect to 100 parts by weight of the main component.

A multilayer electronic component according to the present invention includes conductor layers and ceramic layers, wherein the ceramic layers are composed of the above-mentioned ferrite composition.

Since the ceramic layers are composed of the above-mentioned ferrite composition, the electronic component according to the present invention can demonstrate noise removal characteristics equal to or greater than those of a wire-winding type coil device even though the electronic component according to the present invention is a multilayer type electronic component.

DETAILED DESCRIPTION OF INVENTION

First Embodiment

Figure 1:
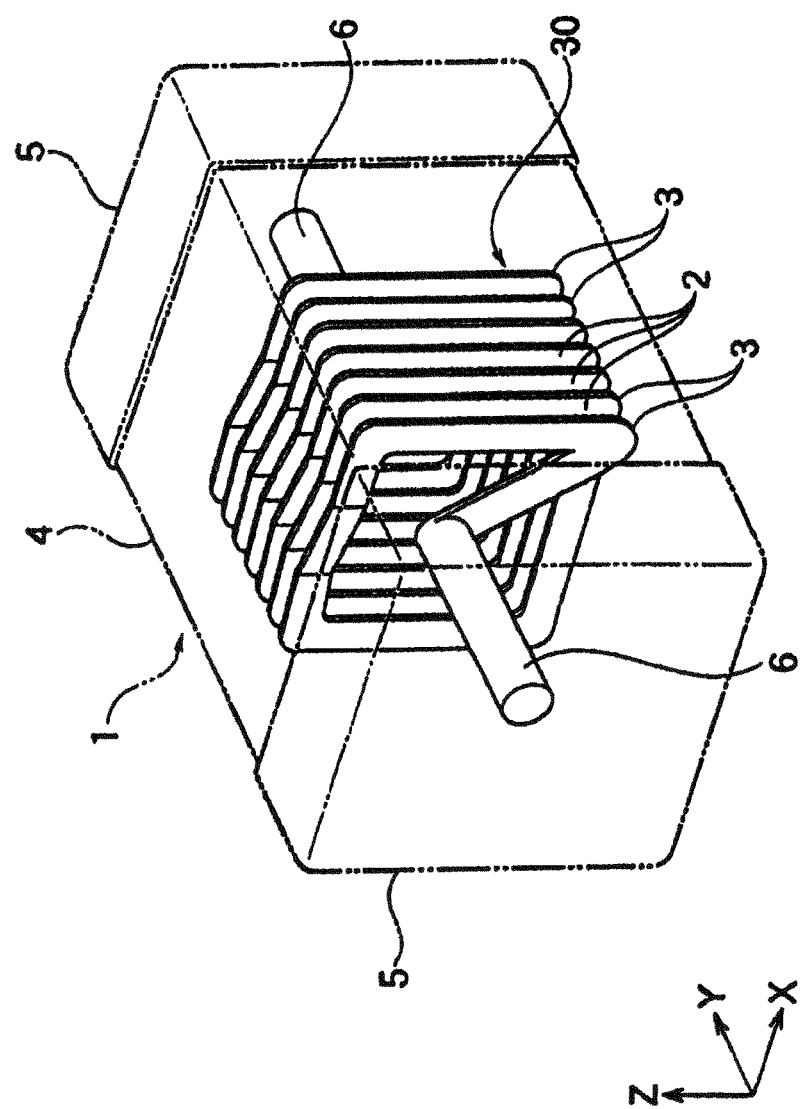
FIG. 1 is an internally transparent perspective view of a multilayer chip coil as an electronic component according to an embodiment of the present invention.

Hereinafter, the present invention is explained based on embodiments shown in the figures. As shown in FIG. 1, a multilayer chip coil 1 as an electronic component according to an embodiment of the present invention includes a chip body 4 containing ceramic layers 2 and internal electrode layers 3 alternately laminated in the Y-axis direction.

Each of the internal electrode layers 3 has a square ring shape, a C shape, or a U shape. The internal electrode layers 3 are spirally connected by a stepped electrode or a through hole electrode (not shown) for connecting internal electrodes going through the adjacent ceramic layers 2 and constitute a coil conductor 30.

Terminal electrodes 5 and 5 are formed on both ends of the chip body 4 in the Y-axis direction. Each of the terminal electrodes 5 is connected with an end of a terminal-connection through hole electrode 6 going through the laminated ceramic layers 2. The terminal electrodes 5 and 5 are connected with both ends of the coil conductor 30 forming a closed-magnetic-path coil (winding wire pattern).

In the present embodiment, the ceramic layers 2 and the internal electrode layers 3 are laminated in the Y-axis direction, and the end surfaces of the terminal electrodes 5 and 5 are parallel to the X-axis and the Z-axis. The X-axis, the Y-axis, and the Z-axis are perpendicular to each other. In the multilayer chip coil 1 shown in FIG. 1, the winding axis of the coil conductor 30 substantially corresponds to the Y-axis.

The chip body 4 has any outer shape and size that can approximately be determined based on purposes, but normally has a substantially rectangular parallelepiped shape with, for example, a length of 0.15 to 0.8 mm in the X-axis direction, a length of 0.3 to 1.6 mm in the Y-axis direction, and a length of 0.1 to 1.0 mm in the Z-axis direction.

The ceramic layers 2 have any thickness between electrodes and any base thickness. The ceramic layers 2 can have a thickness between electrodes (an interval between the internal electrode layers 3 and 3) of about 3 to 50 μm and a base thickness (a length of the terminal-connection through hole electrode 6 in the Y-axis direction) of about 5 to 300 μm.

In the present embodiment, the terminal electrodes 5 are not limited and are formed by attaching a conductive paste whose main component is Ag, Pd, etc. onto the outer surface of the chip body 4, firing the paste, and subjecting it to an electric plating. The electric plating can be carried out using Cu, Ni, Sn, etc.

The coil conductor 30 contains Ag (including an Ag alloy) and is composed of Ag alone, Ag—Pd alloy, or the like. The coil conductor 30 can contain a sub-component of Zr, Fe, Mn, Ti, and an oxide thereof.

The ceramic layers 2 are composed of a ferrite composition according to an embodiment of the present invention. Hereinafter, the ferrite composition is explained in detail.

The ferrite composition according to the present embodiment includes main-phase particles composed of spinel ferrite, first sub-phase particles, second sub-phase particles, and a grain boundary, wherein at least 10% or more of the main-phase particles contain a portion whose Zn concentrations monotonously decrease from a particle surface toward a particle central part along a length of 50 nm or more, the first sub-phase particles contain $Zn_2SiO_4$, the second sub-phase particles contain $SiO_2$, and a total area ratio of the first sub-phase particles and the second sub-phase particles is 30.5% or more.

Figure 3A:
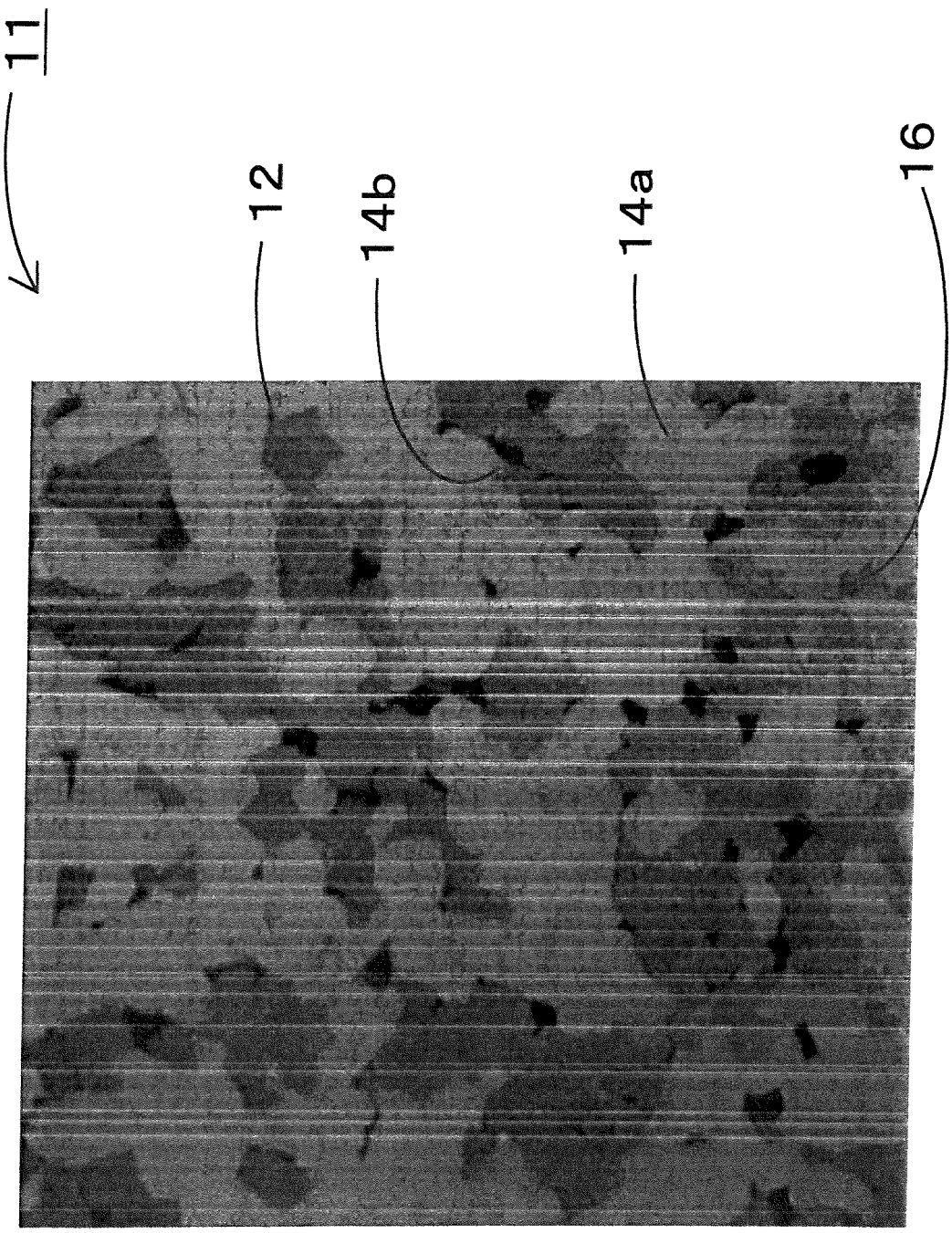
FIG. 3A is a STEM-EDS image of a ferrite composition according to the present embodiment.
Figure 3B:
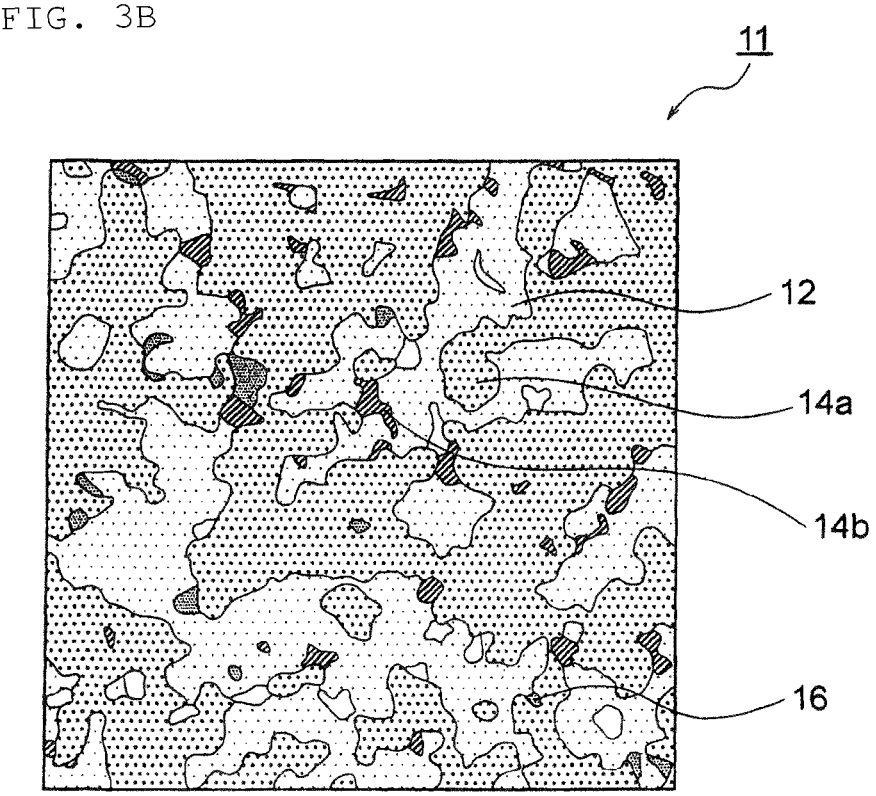
FIG. 3B is a schematic view of a ferrite composition according to the present embodiment.

Preferably, the ferrite composition according to the present embodiment has a composite structure as shown in FIG. 3A and FIG. 3B.

FIG. 3A is an observation result of a ferrite composition 11 according to the present embodiment at 20,000 times magnification by STEM-EDS. FIG. 3B is a schematic view of FIG. 3A. The ferrite composition 11 contains main-phase particles 12 composed of spinel ferrite and further contains first sub-phase particles 14a containing $Zn_2SiO_4$ and second sub-phase particles 14b containing $SiO_2$. Moreover, a grain boundary 16 containing $SiO_2$ is contained among the respective particles (the main-phase particles 12, the first sub-phase particles 14a, and the second sub-phase particles 14b). A content ratio of $SiO_2$ in each of the second sub-phase particles 14b and the grain boundary 16 may be higher than that in the main-phase particles 12. In the first sub-phase particles 14a, other elements, such as Ni, Cu, and Co, may be contained and may be solid-soluted in $Zn_2SiO_4$. The second sub-phase particles 14b may contain other elements, such as Fe and Ni. In addition to $SiO_2$, the grain boundary 16 may contain $Bi_2O_3$ more than the main-phase particles 12 do. Incidentally, the second sub-phase particles 14b and the grain boundary 16 are provisionally distinguished in FIG. 3A and FIG. 3B. Specifically, the second sub-phase particles 14b are a portion where a content ratio of $SiO_2$ is larger than that of $Bi_2O_3$ by weight ratio, and the grain boundary 16 is a portion where a content ratio of $SiO_2$ is equal to or lower than that of $Bi_2O_3$ by weight ratio. The second sub-phase particles 14b and the grain boundary 16 can further accurately be distinguished by the observation using a STEM-EDS at a higher magnification.

Figure 4A:
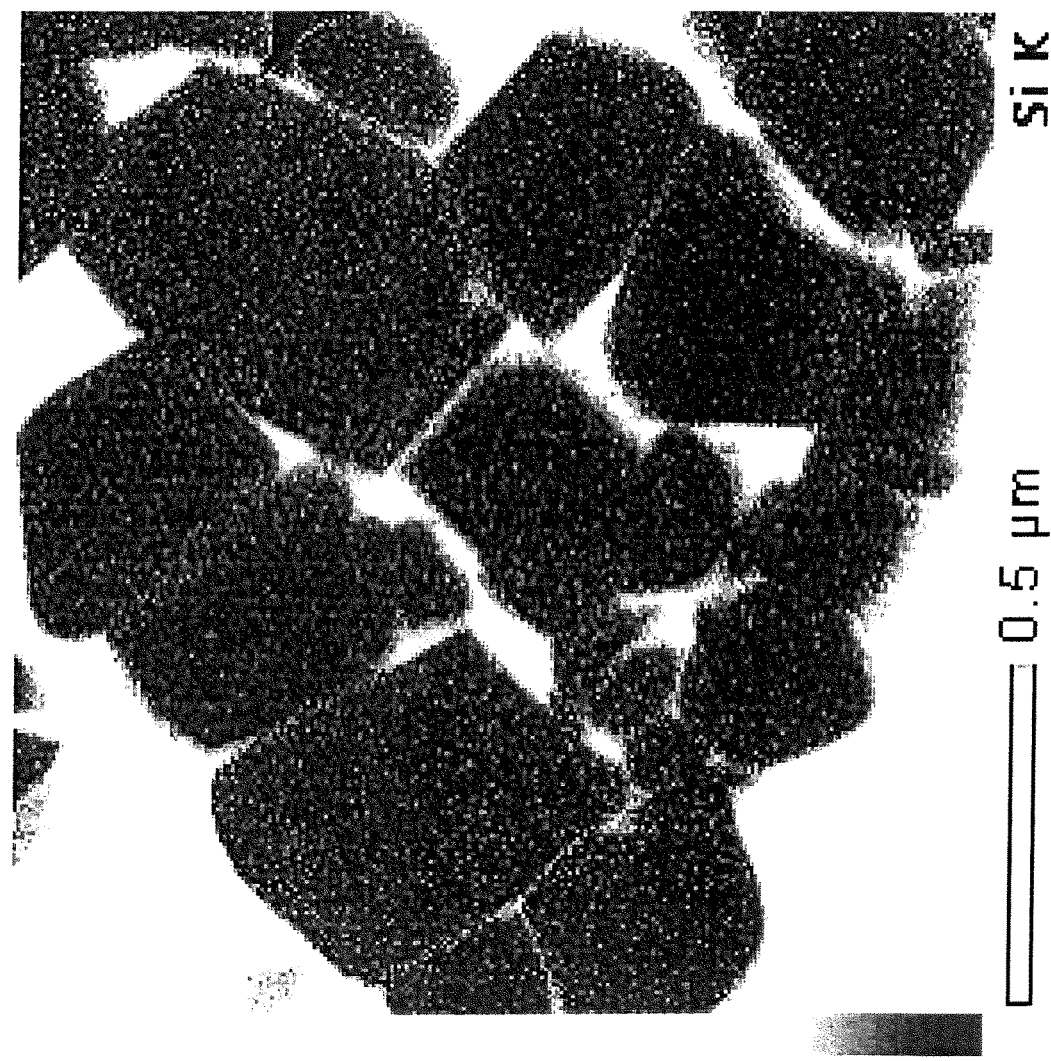
FIG. 4A is a Si element mapping image of a ferrite composition according to the present embodiment.
Figure 4B:
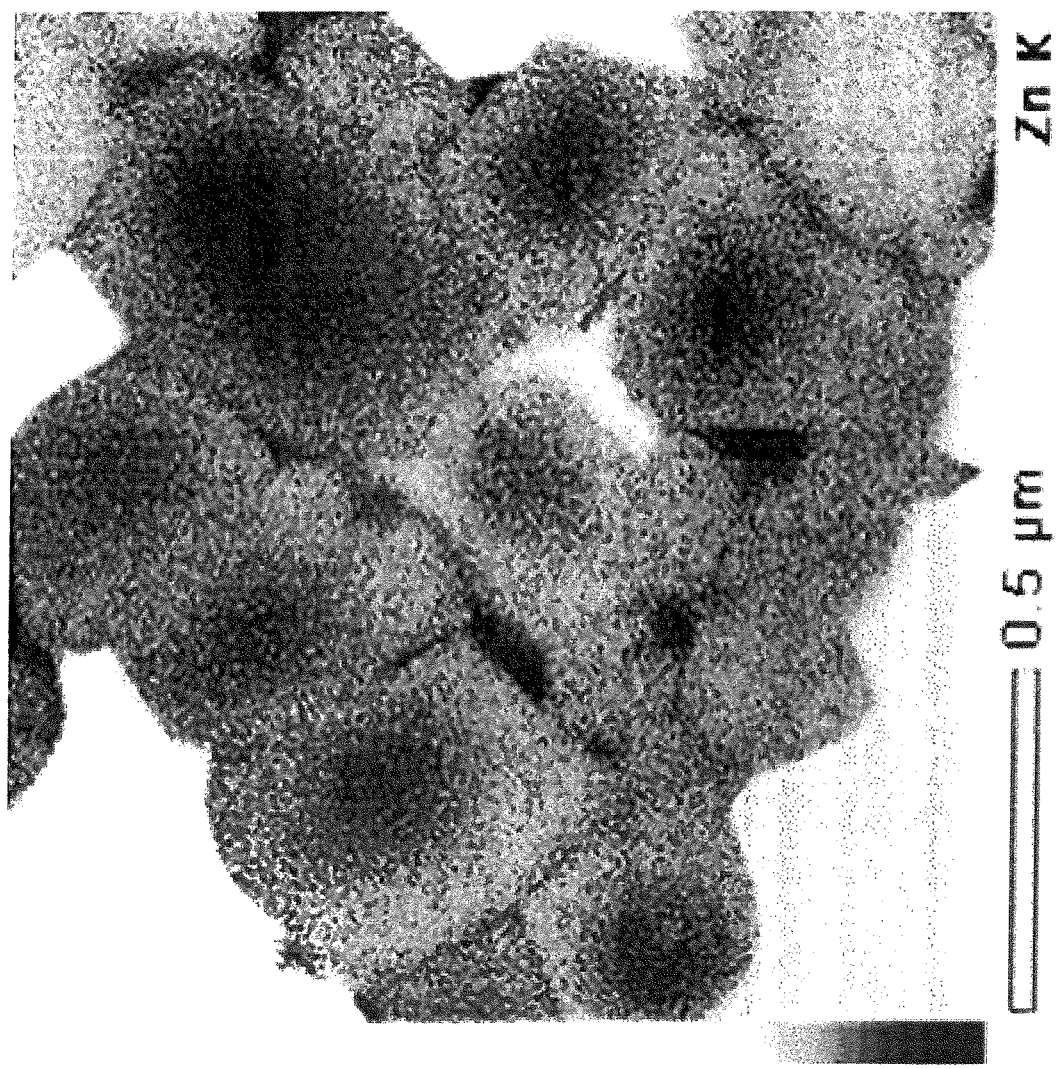
FIG. 4B is a Zn element mapping image of a ferrite composition according to the present embodiment.
Figure 4C:
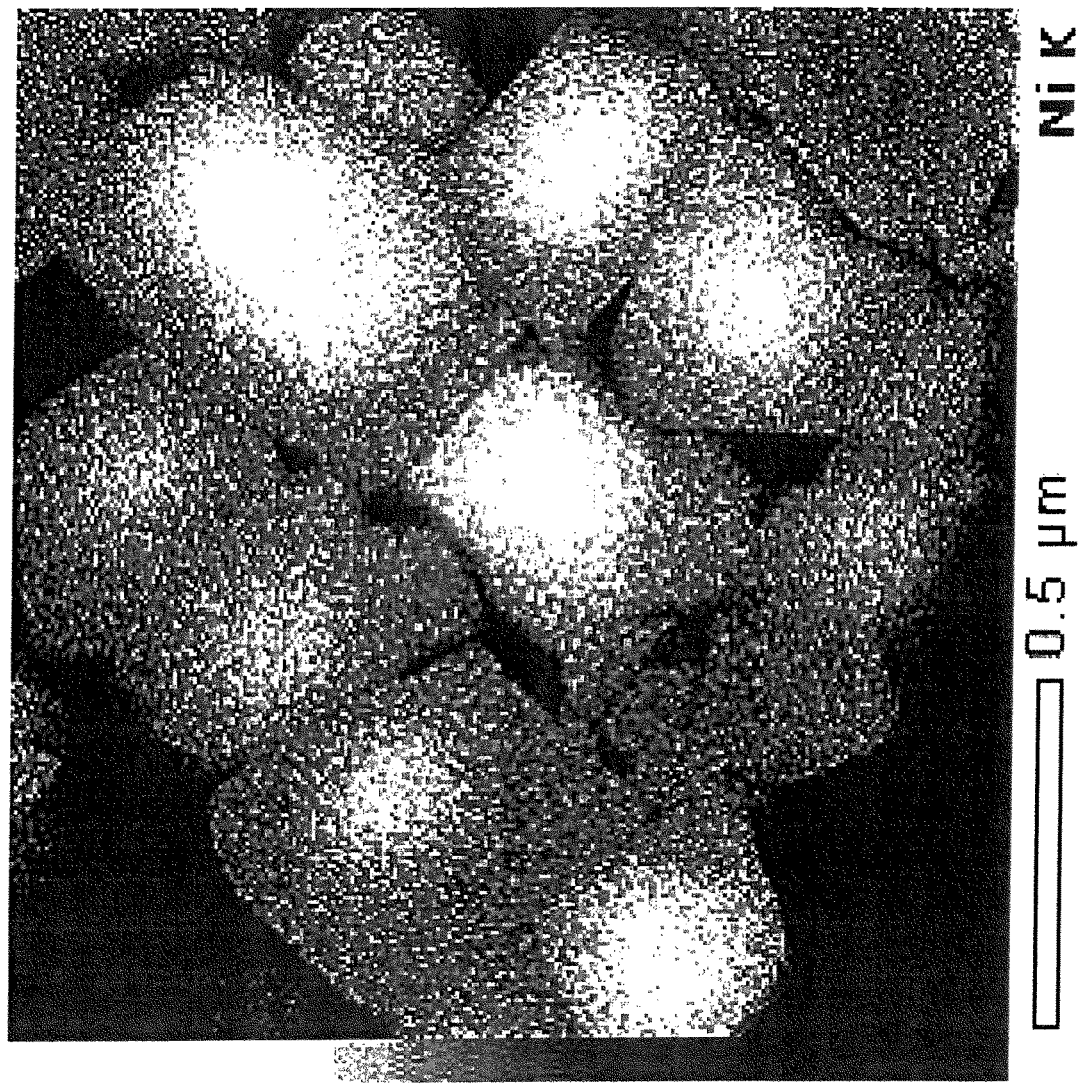
FIG. 4C is a Ni element mapping image of a ferrite composition according to the present embodiment.
Figure 5:
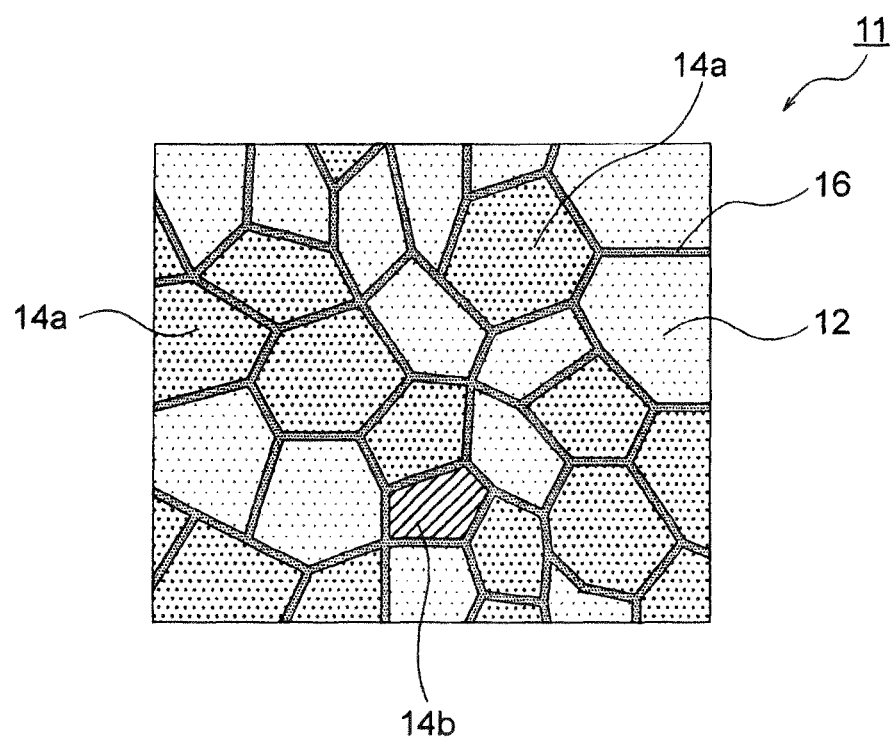
FIG. 5 is a schematic view of a ferrite composition according to the present embodiment.

FIG. 4A, FIG. 4B, and FIG. 4C are respectively a Si element mapping image, a Zn element mapping image, and a Ni element mapping image of the ferrite composition 11 according to the present embodiment obtained using STEM-EDS at 100,000 times magnification. FIG. 5 is a schematic view of FIG. 4A to FIG. 4C. In the element mapping images obtained using STEM-EDS, a brighter area contains a larger amount of the mapped element, and a darker area contains a smaller amount of the mapped element. In FIG. 4A to FIG. 4C and FIG. 5, it is clear that the ferrite composition 11 is composed of multiple particles, and it is also clear that the ferrite composition 11 contains the main-phase particles 12, the first sub-phase particles 14a, the second sub-phase particles 14b, and the grain boundaries 16. Incidentally, there are times when the sub-phase particles 14b and the grain boundaries 16 cannot accurately be distinguished from each other.

The kind of each portion in FIG. 4A to FIG. 4C and FIG. 5 can be confirmed by STEM-EDS. For example, the first sub-phase particles 14a are a portion having a particle shape and having a larger Zn content and a larger Si content compared to those of the main-phase particles 12 due to the inclusion of $Zn_2SiO_4$, and the second sub-phase particles 14b are a portion having a particle shape and having a larger Si content compared to that of the main-phase particles 12 due to the inclusion of $SiO_2$. Meanwhile, the second sub-phase particles 14b are a portion whose Zn content is as equal as that of the main-phase particles 12. The grain boundaries 16 are a portion having a higher Si concentration compared to that of the main-phase particles 12 and existing among the particles with no particle shape. Backscattered electron image, Bi mapping image, etc. may be measured by STEM-EDS and also be used for determining the kind of the portions.

Compared to the main-phase particles 12 composed of spinel ferrite, the first sub-phase particles 14a containing $Zn_2SiO_4$, the second sub-phase particles 14b containing $SiO_2$, and the grain boundaries 16 containing $SiO_2$ have a smaller thermal expansion coefficient. Thus, the respective sub-phase particles and the grain boundaries having a smaller thermal expansion coefficient apply a tensile stress to the main-phase particles 12 having a larger thermal expansion coefficient. This application improves inductance characteristics of a coil device using the ferrite composition 11.

In the ferrite composition 11 according to the present embodiment, the proportion of the total of the first sub-phase particles 14a and the second sub-phase particles 14b to the total of the main-phase particles 12, the first sub-phase particles 14a, the second sub-phase particles 14b, and the grain boundaries 16 is larger than that of conventional ferrite compositions. In particular, the proportion of the first sub-phase particles 14a containing $Zn_2SiO_4$ is large. Specifically, in a STEM-EDS image with a magnification that is 20,000 times or more and can observe the main-phase particles 12, the total area ratio of the first sub-phase particles 14a and the second sub-phase particles 14b may be 30.5% or more, 50% or more, or 70% or less with respect to 100% of the total area ratio of the main-phase particles 12, the first sub-phase particles 14a, the second sub-phase particles 14b, and the grain boundaries 16. Incidentally, since both the second sub-phase particles 14b and the grain boundaries 16 contain $SiO_2$, there are times when the second sub-phase particles 14b and the grain boundaries 16 cannot be distinguished from each other in the STEM-EDS images. Then, there are times when the second sub-phase particles 14b appear to be in contact with the main-phase particles 12 or the first sub-phase particles 14a. In the ferrite composition 11, however, the ratio of the grain boundaries 16 located around the second sub-phase particles 14b is negligibly small. Thus, even if the second sub-phase particles 14b and the grain boundaries 16 cannot be distinguished from each other, this does not greatly affect the above-mentioned calculation of the area ratio. The second sub-phase particles 14b and the grain boundaries 16 may be distinguished from each other provided that the grain boundaries 16 have a width of less than 100 nm, and that the sub-phase particles 14b have a particle size of 100 nm or more and 2 μm or less.

When the total area ratio of the first sub-phase particles 14a and the second sub-phase particles 14b is 30.5% or more or 50% or more, the above-mentioned tensile stress is sufficiently applied. Moreover, when the total area ratio of the first sub-phase particles 14a and the second sub-phase particles 14b is 30.5% or more or 50% or more, the area ratio of the respective sub-phase particles, which are non-magnetic particles and hard to be passed by magnetic flux, is large. The ferrite composition 11 has a three-dimensional structure where the main-phase particles 12 and the respective sub-phase particles are tangled. Thus, the ferrite composition 11 has a complex structure where the main-phase particles 12 (magnetic particles) and the respective sub-phase particles (non-magnetic particles) are dispersed. Here, it is easier for magnetic flux to pass through the main-phase particles 12 (magnetic particles) than through the respective sub-phase particles (non-magnetic particles). Thus, the magnetic path length of magnetic flux mainly passing through the main-phase particles 12 (magnetic particles) is large, and the magnetic path length of magnetic flux passing through the respective sub-phase particles (non-magnetic particles) is comparatively small. As a result, the ferrite composition 11 has a three-dimensional magnetic path structure, and an effect of reducing magnetic saturation by minor multiple gaps (dispersion gap effect) is large. Since the dispersion gap effect is large, the coil device composed of the ferrite composition 11 has improved inductance characteristics particularly when used with large electric current, a high permeability μ', and favorable DC superposition characteristics and AC resistance. Incidentally, permeability μ' is a real part of complex permeability.

Preferably, the area ratio of the first sub-phase particles 14a on a cross section of the ferrite composition 11 is 30% or more and 70% or less. The area ratio of the second sub-phase particles 14b is preferably 0.5% or more and 5% or less and may be 0.5% or more and 1% or less. The area ratio of the main-phase particles 12 is preferably 30% or more and 50% or less. Incidentally, the area ratio of the grain boundaries 16 is preferably 0.1% or more and 4.0% or less, and the total area ratio of the second sub-phase particles 14b and the grain boundaries 16 is preferably 0.6% or more and 9% or less.

In the ferrite composition 11 according to the present embodiment, at least some of the main-phase particles 12 have Zn concentrations decreasing from a particle surface toward a particle central part. Specifically, at least some of the main-phase particles 12 contain a portion whose Zn concentrations monotonously decrease from a particle surface toward a particle central part along a length of 50 nm or more. Incidentally, this portion may be contained anywhere in each of the main-phase particles 12. When at least some of the main-phase particles 12 have such a concentration gradient, the above-mentioned tensile stress is considered to be transmitted efficiently. Incidentally, the above-mentioned particle central part is a part away from the particle surface of the main-phase particle 12 by at least 50 nm. The main-phase particles 12 may have a Ni concentration gradient increasing from a particle surface toward a particle central part. Specifically, the main-phase particles 12 may have a portion whose Ni concentrations monotonously increase from a particle surface toward a particle central part along a length of 50 nm or more.

Whether or not the main-phase particle 12 has such a concentration gradient is confirmed by any method, such as line analysis by STEM-EDS. Hereinafter, a line analysis by EDS is explained based on the figures.

Figure 6:
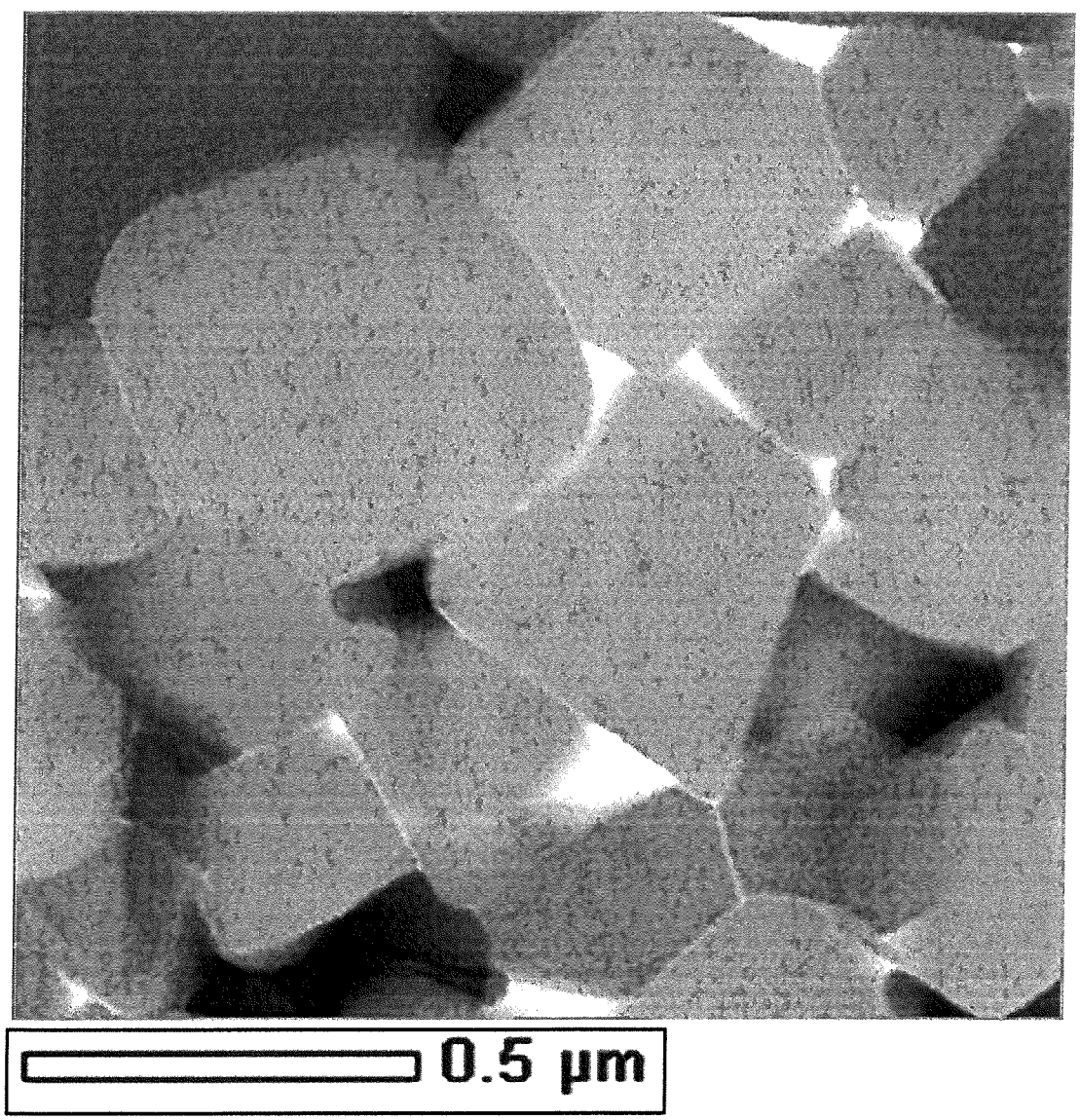
FIG. 6 is a STEM-EDS image of a ferrite composition according to the present embodiment.
Figure 7:
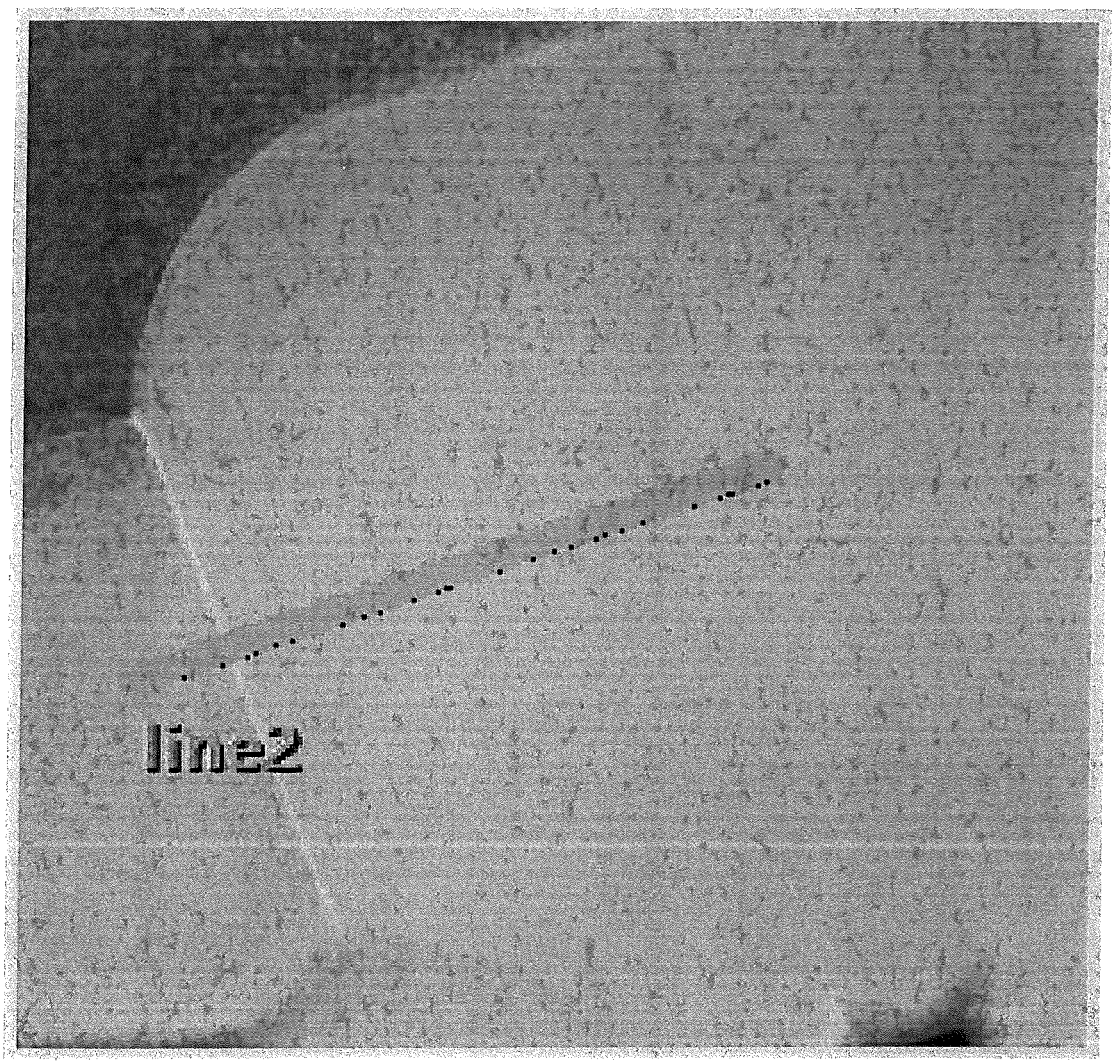
FIG. 7 is an enlarged image of FIG. 6 showing a measurement point of line analysis by EDS.

When a main-phase particle undergoes a line analysis by STEM-EDS, a STEM image of a cross section of the ferrite composition is initially observed as shown in FIG. 6. Then, the main-phase particle is enlarged as shown in FIG. 7, and a measurement point of the line analysis is selected. At this time, the measurement point is selected so that the line analysis can be carried out from a particle surface toward a particle central part including the grain boundary. In FIG. 7, the measurement point of the line analysis is represented as "line 2".

Figure 8:
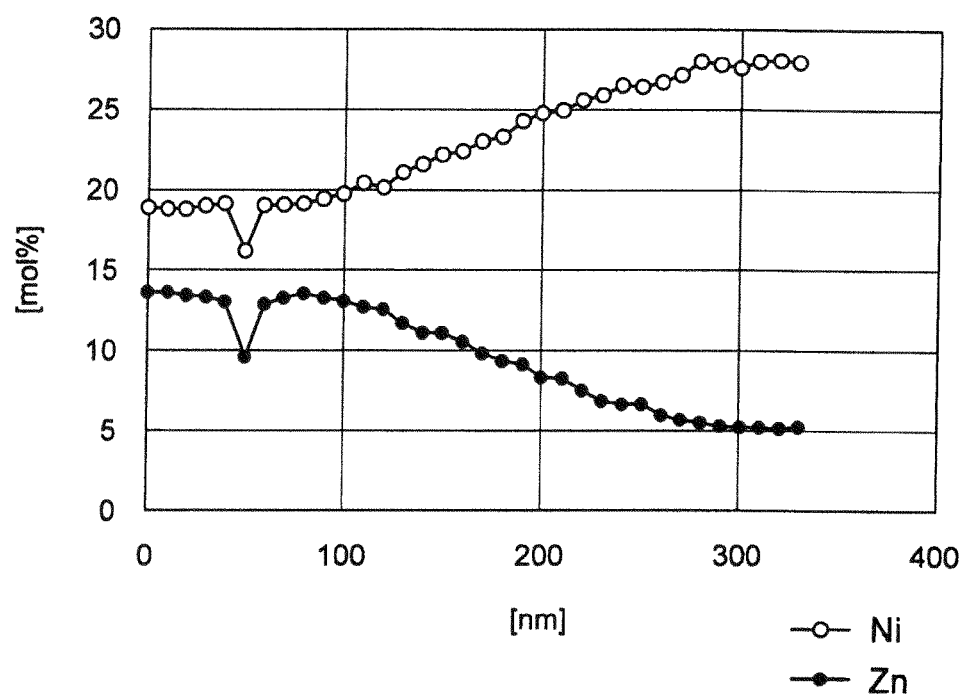
FIG. 8 is a graph showing the results of line analysis by EDS.
Figure 9:
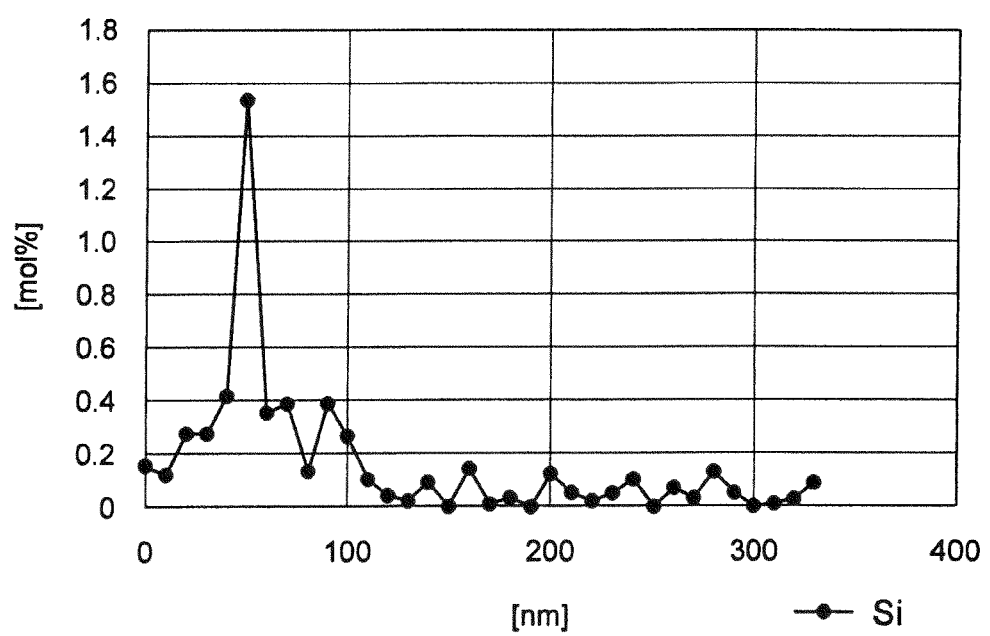
FIG. 9 is a graph showing the results of line analysis by EDS.

Then, the line analysis is carried out. The Zn concentrations are measured at intervals of at least 10 nm or less on "line 2" and are graphed. In FIG. 8, the Zn concentrations are measured at intervals of 10 nm. Incidentally, FIG. 8 also includes the measurement results of the Zn concentrations, and FIG. 9 includes the measurement results of the Si concentrations. In the graphs of FIG. 8 and FIG. 9, the left edge of "line 2" shown in FIG. 7 is set as 0 nm.

In FIG. 8 and FIG. 9, at the point of 50 nm from the left edge of "line 2", the Zn concentrations and the Ni concentrations decrease greatly, and the Si concentrations increases greatly. In conjunction with FIG. 7, the grain boundary is a peripheral part of 50 nm from the left edge of "line 2".

Then, observed is the change of the Zn concentrations in a portion of 60 nm to 330 nm from the left edge of "line 2". The Zn concentrations are substantially uniform in a portion of about 60 nm to 330 nm. The Zn concentrations monotonously decrease in a portion of about 100 nm to 300 nm. The Zn concentrations are substantially uniform in a portion of about 300 nm to 330 nm. Even if the measurement point of the line analysis is further extended, the Zn concentrations are considered to be substantially uniform to the particle surface of the next main-phase particle.

As a general rule, whether or not the main-phase particle has a Zn concentration gradient is visually determined by a graph showing the result of the line analysis of the Zn concentrations as shown in FIG. 8. Specifically, when a portion whose Zn concentrations monotonously decrease has a length of 50 nm or more, the main-phase particle is considered to have a Zn concentration gradient.

Moreover, observed is the change of the Ni concentrations in a portion of 60 nm to 330 nm from the left edge of "line 2". The Ni concentrations are substantially uniform in a portion of about 60 nm to 80 nm. The Ni concentrations monotonously increase in a portion of about 80 nm to 280 nm. The Ni concentrations are substantially uniform in a portion of about 280 nm to 330 nm. Even if the measurement point of the line analysis is further extended, the Ni concentrations are considered to be substantially uniform to the particle surface of the main-phase particle.

As a general rule, whether or not the main-phase particle has a Ni concentration gradient is visually determined by a graph showing the result of the line analysis of the Ni concentrations as shown in FIG. 8. Specifically, when a part whose Ni concentrations monotonously decrease has a length of 50 nm or more, the main-phase particle is considered to have a Ni concentration gradient.

When the change of the Si concentrations in a portion of 60 nm to 330 nm from the left edge of "line 2" is observed, the Si concentrations in a portion close to the grain boundary (a portion of the main-phase particle close to a particle surface) is substantially higher than that in a portion distant from the grain boundary (a portion of the main-phase particle close to a particle central part).

Accordingly, the ferrite composition 11 according to the present embodiment includes the main-phase particles 12 composed of spinel ferrite and having a Zn concentration gradient decreasing from a particle surface toward a particle central part. Incidentally, not all of the main-phase particles 12 need to have a Zn concentration gradient decreasing from a particle surface toward a particle central part, but 10% or more or 20% or more of the main-phase particles based on number have a Zn concentration gradient decreasing from a particle surface toward a particle central part.

As the magnitude of the Zn concentration gradient, an average of A2/A1 is preferably 1.10 or more, where A1 and A2 are respectively a minimum value and a maximum value of Zn concentrations in each of the main-phase particles 12. The average of A2/A1 may be 1.80 or more, or may be 2.50 or less. In the actual measurement, a minimum value and a maximum value of the Zn concentrations of the graph obtained by the line analysis may be regarded as the minimum value A1 and the maximum value A2, respectively, of the Zn concentrations in each of the main-phase particles. The line analysis is carried out for two or more main-phase particles having the concentration gradient. An average value of A2/A1, which is obtained by the line analysis, is calculated.

Accordingly, the ferrite composition 11 according to the present embodiment may include the main-phase particles 12 composed of spinel ferrite and having a Ni concentration gradient increasing from a particle surface toward a particle central part.

In other words, the Zn concentrations are comparatively high in a part of the main-phase particle 12 close to the grain boundary 16 (a part close to particle surface). In a part of the main-phase particle 12 close to the grain boundary 16, the Ni concentrations are preferably comparatively low, and the Si concentrations are preferably comparatively high.

According to FIG. 4A to FIG. 4C and FIG. 5 with a higher observation magnification compared to FIG. 3A and FIG. 3B, the grain boundaries 16 containing $SiO_2$ are present among the respective particles (the main-phase particles 12, the first sub-phase particles 14a, and the second sub-phase particles 14b), and there can be seen a Si core-shell structure where a shell (grain boundary 16) composed of $SiO_2$ surrounds a core (the main-phase particle 12, the first sub-phase particle 14a, or the second sub-phase particle 14b).

Incidentally, the grain boundaries 16 may also contain $Bi_2O_3$ in addition to $SiO_2$. The fact that the grain boundaries 16 contain $Bi_2O_3$ and $SiO_2$ can be confirmed by, for example, a line analysis of a portion passing through the main-phase particle 12 and the grain boundary 16 using a STEM-EDS.

When the ferrite composition 11 according to the present embodiment includes the grain boundaries 16 containing $SiO_2$, the ratio of the grain boundaries 16 is larger than that of grain boundaries of conventional ferrite compositions. This means that the grain boundaries 16 are thicker than those of conventional ferrite compositions. Then, the grain boundaries 16 containing $SiO_2$ and having a thermal expansion coefficient being different from that of the main-phase particles 12 are contained and cover the respective particles, and a tensile stress is thereby applied from the grain boundaries 16 to the respective particles. When the tensile stress is sufficiently applied, the ferrite composition 11 has improved inductance characteristics and favorable DC superposition characteristics and AC resistance. In the present embodiment, the area ratio of the grain boundaries 16 is preferably 0.1% or more and 4.0% or less with respect to 100% of the total area ratio of the main-phase particles 12, the first sub-phase particles 14a, the second sub-phase particles 14b, and the grain boundaries 16, all of which have a thermal expansion coefficient differing from that of the main-phase particles 12, in a STEM-EDS image that is large enough to observe the main-phase particles 12 at a magnification of 20000 times or more. Incidentally, there are times when the second sub-phase particles 14b and the grain boundaries 16 cannot be distinguished from each other, but many of the grain boundaries 16 are located around the main-phase particles 12 or the first sub-phase particles 14a, and the ratio of the grain boundaries 16 located around the second sub-phase particles 14b is small. Thus, even if the second sub-phase particles 14b and the grain boundaries 16 cannot be distinguished from each other, this does not greatly affect the above-mentioned calculation of the area ratio. The second sub-phase particles 14b and the grain boundaries 16 may be distinguished from each other provided that the grain boundaries 16 have a width of less than 100 nm, and that the sub-phase particles 14b have a particle size of 100 nm or more and 2 μm or less.

Incidentally, when the main-phase particles 12, the first sub-phase particles 14a, and the second sub-phase particles 14b of the ferrite composition 11 according to the present embodiment are crystal particles, they preferably have an average crystal particle size of 0.2 to 1.5 μm. The average crystal particle size is measured by any method, such as XRD.

The ferrite composition 11 according to the present embodiment has any composition. For example, the ferrite composition 11 according to the present embodiment includes a main component and a sub-component. The main component may include 10.0 to 50.0 mol % of a Fe compound in terms of $Fe_2O_3$, 3.0 to 14.0 mol % of a Cu compound in terms of CuO, 10.0 to 80.0 mol % of a Zn compound in terms of ZnO, and a balance of a Ni compound. The sub-component may include 3.0 to 25.0 parts by weight of a Si compound in terms of $SiO_2$ with respect to 100 parts by weight of the main component. Moreover, the sub-component may include a Co compound and/or a Bi compound.

Preferably, the main component includes 10.0 to 38.0 mol % of a Fe compound in terms of $Fe_2O_3$, 3.0 to 11.0 mol % of a Cu compound in terms of CuO, 39.0 to 80.0 mol % (excluding 39.0 mol %) of a Zn compound in terms of ZnO, and a balance of a Ni compound, and the sub-component includes 10.0 to 23.0 parts by weight of a Si compound in terms of $SiO_2$, 0 to 3.0 parts by weight (including 0 parts by weight) of a Co compound in terms of $Co_3O_4$, and 0.1 to 3.0 parts by weight of a Bi compound in terms of $Bi_2O_3$ with respect to 100 parts by weight of the main component.

The ferrite composition 11 according to the present embodiment contains a main component of a Fe compound, a Cu compound, a Zn compound, and a Ni compound. For example, the Fe compound may include $Fe_2O_3$, the Cu compound may include CuO, the Zn compound may include ZnO, and the Ni compound may include NiO.

When the amount of the Fe compound is large, DC superposition characteristics are easy to decrease. When the amount of the Fe compound is small, permeability $\mu'$ is easy to decrease.

When the amount of the Cu compound is large, DC superposition characteristics are easy to decrease, and AC resistance is easy to increase. When the amount of the Cu compound is small, sinterability deteriorates (particularly, sintering density in low temperature sintering is easy to decrease), and permeability $\mu'$ is easy to decrease.

When the amount of the Zn compound is large, permeability $\mu'$ is easy to decrease. When the amount of the Zn compound is small, DC superposition characteristics are easy to decrease, and AC resistance is easy to increase.

The balance of the main component is composed of the Ni compound. When the amount of the Ni compound is large, DC superposition characteristics are easy to decrease, and AC resistance is easy to increase.

In addition to the above-mentioned main component, the ferrite composition according to the present embodiment includes a sub-component of at least a Si compound and may further include a Co compound and/or a Bi compound.

When the amount of the Si compound is large, sinterability deteriorates, and permeability $\mu'$ is easy to decrease. When the amount of the Si compound is small, DC superposition characteristics are easy to decrease, and AC resistance is easy to increase.

When the amount of the Co compound is large, permeability $\mu'$ is easy to decrease. When the amount of the Bi compound is large, DC superposition characteristics are easy to decrease, AC resistance is easy to increase, and permeability $\mu'$ is easy to decrease.

The Bi compound has an effect of promoting the generation of $Zn_2SiO_4$ in sintering step. When bismuth oxide is added in pulverization of a calcined material, the effect of promoting the generation of $Zn_2SiO_4$ is particularly large.

(the amount of the Co compound in terms of $Co_3O_4$)/(the amount of the Si compound in terms of $SiO_2$) (hereinafter, simply referred to as "Co/Si") may be 0.0052 to 0.20 in weight ratio. When Co/Si is high, permeability $\mu'$ is easy to decrease. When Co/Si is low, AC resistance is easy to increase, and density is easy to decrease.

Incidentally, when the ferrite composition is manufactured, the amount of each constituent of the main component and the sub-component does not substantially change from a step of the raw material powder to a step after firing.

In the ferrite composition according to the present embodiment, the composition range of each constituent of the main component is controlled to the above-mentioned range, and the sub-component of at least the Si compound range, may be additionally contained within the above-mentioned range. In this case, it is easy to obtain a ferrite composition having a favorable sinterability, a high permeability and favorable DC superposition characteristics and AC resistance. In addition, the ferrite composition according to the present embodiment can be sintered at about 900° C., which is equal to or lower than the melting point of Ag (used as the internal electrodes), and is thereby applicable to various purposes. The sub-component may include a Co compound and/or a Bi compound.

Apart from the sub-component, the ferrite composition according to the present embodiment may include an additional component of manganese oxide (e.g., $Mn_3O_4$), zirconium oxide, tin oxide, magnesium oxide, glass compound, etc. as long as the effects of the present invention are not disturbed. The amount of the additional component is not limited and is, for example, about 0.05 to 1.0 parts by weight with respect to 100 parts by weight of the main component.

In particular, the amount of magnesium oxide is preferably 0.5 parts by weight or less (including zero). When the amount of magnesium oxide is 0.5 parts by weight or less, the reaction between MgO and $SiO_2$ is prevented, and the first sub-phase particles containing $Zn_2SiO_4$ are easily generated.

Moreover, the ferrite composition according to the present embodiment may contain an oxide of inevitable impurity elements.

The inevitable impurity elements are elements other than the above-mentioned elements. More specifically, the inevitable impurities are C, S, Cl, As, Se, Br, Te, I, Li, Na, Mg, Al, Ca, Ga, Ge, Sr, Cd, In, Sb, Ba, Pb, Sc, Ti, V, Cr, Y, Nb, Mo, Pd, Ag, Hf, Ta, etc. The oxide of the inevitable impurity elements may be contained as long as its amount is about 0.05 parts by weight or less in the ferrite composition.

In particular, when the Al content is 0.05 parts by weight or less with respect to 100 parts by weight of the main component in terms of $Al_2O_3$, sinterability and resistivity are easy to improve.

Next, explained is a method of manufacturing the ferrite composition according to the present embodiment. Starting raw materials (raw materials of the main component and raw materials of the sub-component) are initially weighed to have a predetermined composition ratio. Incidentally, the starting raw materials preferably have an average grain size of 0.05 to 1.0 μm.

The raw materials of the main component can be iron oxide ($\alpha$-$Fe_2O_3$), copper oxide (CuO), nickel oxide (NiO), zinc oxide (ZnO), a composite oxide, etc. This composite oxide is, for example, zinc silicate ($Zn_2SiO_4$). Moreover, it is possible to use various compounds or so to be the above-mentioned oxides or composite oxide by firing. Examples of materials to be the above-mentioned oxides by firing include metal single substance, carbonate, oxalate, nitrate, hydroxide, halide, and organometallic compound.

The raw materials of the sub-component can be silicon oxide, bismuth oxide, and/or cobalt oxide. The oxide to be the raw materials of the sub-component is not limited and can be a composite oxide or so. This composite oxide is, for example, zinc silicate ($Zn_2SiO_4$). Moreover, it is possible to use various compounds or so to be the above-mentioned oxides or composite oxide by firing. Examples of materials to be the above-mentioned oxides include metal single substance, carbonate, oxalate, nitrate, hydroxide, halide, and organometallic compound.

Incidentally, $Co_3O_4$ (a form of cobalt oxide) is favorable as a raw material of the cobalt compound because $Co_3O_4$ is easily stored and handled and is stable in terms of valence even in the air.

Next, iron oxide, copper oxide, nickel oxide, and zinc oxide (the raw materials of the main component) are mixed to obtain a raw material mixture. Among the above-mentioned raw materials of the main component, zinc oxide may not be added at this stage and may be added along with zinc silicate after the raw material mixture is calcined. On the contrary, at this stage, a part of the raw materials of the sub-component may be mixed with the raw materials of the main component. The existence ratio of the main-phase particles, the first sub-phase particles, the second sub-phase particles, and the grain boundaries can be controlled by appropriately controlling the kind and ratio of the raw materials contained in the raw material mixture and the kind and ratio of the raw materials added after the raw material mixture is calcined.

Specifically, the larger the amount of $Zn_2SiO_4$ added after calcination is, the larger the area ratio of the first sub-phase particles tends to be. Moreover, the larger the amount of $SiO_2$ added after calcination is, the larger the area ratio of the second sub-phase particles tends to be. Moreover, the smaller the amount of ZnO in the raw material mixture is, the larger the area ratio of the second sub-phase particles or the grain boundaries tends to be.

The mixing is carried out by any method, such as a wet mixing using a ball mill and a dry mixing using a dry mixer.

Next, the raw material mixture is calcined to obtain a calcined material. The calcination causes thermal decomposition of the raw materials, homogenization of the components, generation of ferrite, disappearance of ultrafine powder by sintering, and grain growth to appropriate grain size and is carried out for conversion of the raw material mixture into a form suitable to the following steps. There is no limit to the calcination time or the calcination temperature. The calcination is normally carried out in the atmosphere (air), but may be carried out in an atmosphere whose partial pressure of oxygen is lower than that of the atmosphere.

Next, the calcined material is mixed with silicon oxide, bismuth oxide, cobalt oxide, zinc silicate, etc. to be the raw materials of the sub-component so as to manufacture a mixed calcined material. In particular, the larger the amount of zinc silicate added at this stage is, the more easily the existence ratio of the first sub-phase particles containing $Zn_2SiO_4$ becomes high. Moreover, the larger the amount of zinc silicate added at this stage is, the more easily the above-mentioned concentration distribution is generated in the main-phase particles 12. Moreover, the smaller the amount of Zn in the calcined material is, the more easily the existence ratio of the grain boundaries containing $SiO_2$ and $Bi_2O_3$ becomes high. This is because when the amount of Zn in the calcined material is small, Zn of $Zn_2SiO_4$ is easily solid-soluted into the main-phase particles during firing, and $SiO_2$ is contained in the grain boundaries. Moreover, the larger the amount of silicon oxide added at this stage is, the more easily the existence ratio of the second sub-phase particles containing $SiO_2$ becomes high.

Next, the mixed calcined material is pulverized to obtain a pulverized calcined material. The pulverization is carried out for crushing the aggregation of the mixed calcined material and turning it into a powder having an appropriate sinterability. When the mixed calcined material forms a large lump, a rough pulverization is carried out, and a wet pulverization is thereafter carried out using a ball mill, an attritor, or the like. The wet pulverization is carried out until the pulverized calcined material preferably has an average grain size of about 0.1 to 1.0 μm.

Here, the larger the amount of $Zn_2SiO_4$ added after calcination is, the more easily the above-mentioned Zn concentration gradient is formed in the main-phase particles. The smaller the amount of ZnO in the raw material mixture is, the more easily the above-mentioned Zn concentration gradient is formed in the main-phase particles. The mechanism by which the concentration gradient is formed is shown below.

The raw material mixture containing the main component is calcined to generate a spinel ferrite. The amount of ZnO in the spinel ferrite is proportionate to the amount of ZnO in the raw material mixture.

When $Zn_2SiO_4$ is added after the calcination, the spinel ferrite, which becomes the main-phase particles after firing, and $Zn_2SiO_4$, which is added after the calcination, contact with each other. The firing at this state disintegrates a part of $Zn_2SiO_4$ into ZnO and $SiO_2$. As a result, ZnO is dispersed into the main-phase particles composed of the spinel ferrite. Then, a Zn concentration gradient is generated in the main-phase particles.

A part of $SiO_2$, which is generated by the disintegration, is dispersed into the grain boundaries and located to cover the main-phase particles. The part of $SiO_2$ forms the second sub-phase particles. The rest of $Zn_2SiO_4$, which is not disintegrated, forms the first sub-phase particles.

Hereinafter, explained is a method of manufacturing the multilayer chip coil 1 shown in FIG. 1 using the above-mentioned pulverized material after the wet pulverization.

The multilayer chip coil 1 shown in FIG. 1 can be manufactured by a normal method. That is, the chip body 4 can be formed in such a manner that an internal-electrode paste containing Ag or so and a ferrite paste obtained by kneading the pulverized calcined material with a binder and a solvent are alternately printed and laminated and are thereafter fired (printing method). Instead, the chip body 4 may be formed in such a manner that the internal-electrode paste is printed on green sheets manufactured using the ferrite paste, and the green sheets are laminated and fired (sheet method). In any case, the terminal electrodes 5 are formed by firing, plating, or the like after the chip body is formed.

Each amount of the binder and the solvent in the ferrite paste is not limited. For example, when the entire ferrite paste is 100 wt %, the amount of the binder can be about 1 to 10 wt %, and the amount of the solvent can be about 10 to 50 wt %. If necessary, the ferrite paste may contain 10 wt % or less of dispersant, plasticizer, dielectric, insulator, etc. The internal-electrode paste containing Ag or so can be manufactured in a similar manner. The firing conditions are not limited, but when the internal electrode layers contain Ag or so, the firing temperature is preferably 930° C. or less, more preferably 900° C. or less.

Second Embodiment

Hereinafter, Second Embodiment is explained.

A ferrite composition according to the present embodiment includes main-phase particles composed of spinel ferrite, first sub-phase particles, second sub-phase particles, and a grain boundary, wherein at least 10% or more of the main-phase particles are composed of a core part and a shell part whose Zn concentration is higher than that of the core part, the first sub-phase particles contain $Zn_2SiO_4$, the second sub-phase particles contain $SiO_2$, and a total area ratio of the first sub-phase particles and the second sub-phase particles is 30.5% or more.

In other words, the main-phase particles have a Zn core-shell structure consisting of a Zn shell part having a high Zn concentration and a Zn core part having a low Zn concentration. The Zn shell part has any thickness, such as 10 nm or more and 1000 nm or less.

Whether or not the main-phase particles have the Zn core-shell structure can be confirmed by STEM-EDS. Specifically, a Zn element mapping image shown in FIG. 4B is photographed using a STEM-EDS, and whether or not the main-phase particles have the Zn core-shell structure can be confirmed visually. More specifically, in the main-phase particles having the Zn core-shell structure, the shell part having a high Zn concentration (a comparatively white part of the main-phase particle in FIG. 4B) covers the core part having a low Zn concentration (a comparatively black part of the main-phase particle in FIG. 4B). On the other hand, the main-phase particle without the Zn core-shell structure has a substantially uniform Zn concentration.

The ferrite composition according to the present embodiment has the Zn core-shell structure in the main-phase particles and further has a Si core-shell structure where a shell composed of $SiO_2$ (grain boundary) surrounds the core (main-phase particle or sub-phase particle). That is, the main-phase particles have a double core-shell structure.

In the ferrite composition according to the present embodiment, the main-phase particles may have a Ni core-shell structure consisting of a Ni shell part having a high Ni concentration and a Ni core part having a low Ni concentration. Moreover, the Zn shell part and the Ni shell part may be at the same position, and the Zn core part and the Ni core part may be at the same position.

Whether or not the main-phase particles have the Ni core-shell structure can be confirmed by STEM-EDS. Specifically, a Ni element mapping image shown in FIG. 4C is photographed using a STEM-EDS, and whether or not the main-phase particles have the Ni core-shell structure can be confirmed visually. More specifically, in the main-phase particles having the Ni core-shell structure, the shell part having a low Ni concentration (a comparatively black part of the main-phase particle in FIG. 4C) covers the core part having a high Ni concentration (a comparatively white part of the main-phase particle in FIG. 4C). On the other hand, the main-phase particle without the Ni core-shell structure has a substantially uniform Ni concentration.

Except for the above matters, Second Embodiment is similar to First Embodiment. Incidentally, the manufacturing conditions for enabling the main-phase particles to easily have the Zn concentration gradient in First Embodiment are similar to those for enabling the main-phase particles to easily have the Zn core-shell structure in Second Embodiment.

Incidentally, the present invention is not limited to the above-mentioned embodiments and can variously be changed within the scope of the present invention.

Figure 2:
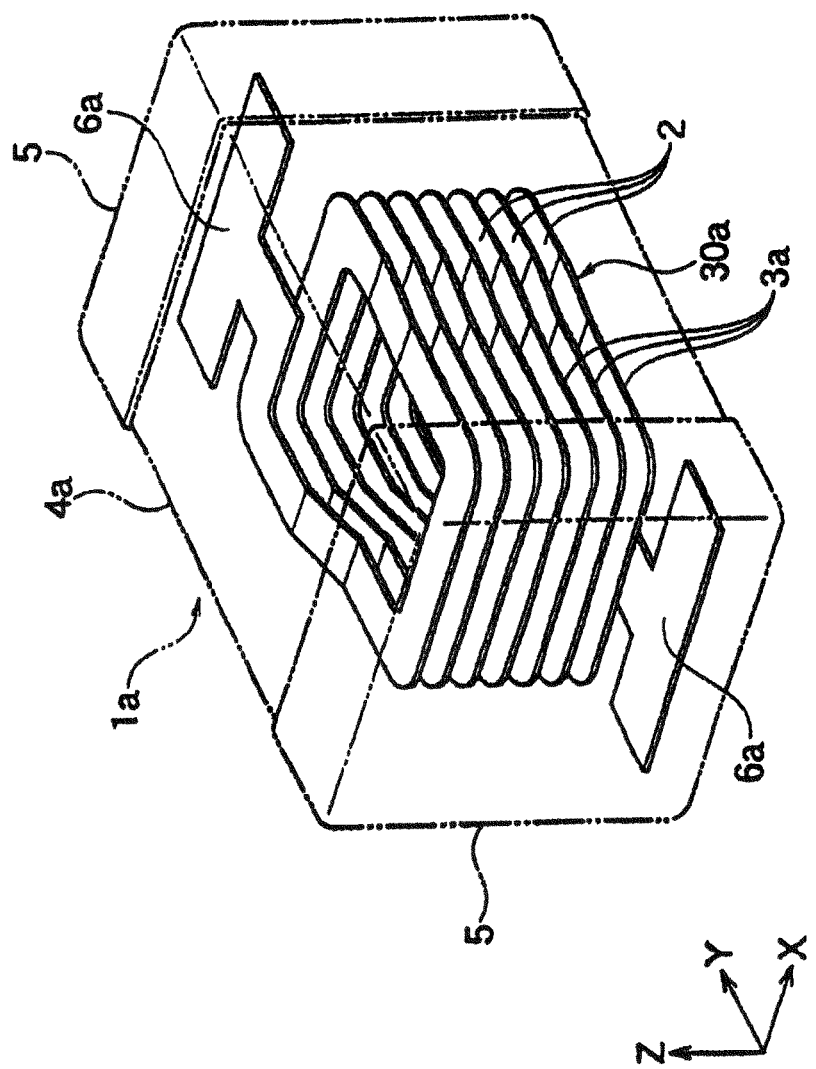
FIG. 2 is an internally transparent perspective view of a multilayer chip coil as an electronic component according to another embodiment of the present invention.

For example, ceramic layers 2 of a multilayer chip coil 1a shown in FIG. 2 may be composed of the ferrite composition of the above-mentioned embodiments. The multilayer chip coil 1a shown in FIG. 2 includes a chip body 4a containing the ceramic layers 2 and internal electrode layers 3a alternately laminated in the Z-axis direction.

Each of the internal electrode layers 3a has a square ring shape, a C shape, or a U shape. The internal electrode layers 3a are spirally connected by a stepped electrode or a through hole electrode (not shown) for connecting internal electrodes going through the adjacent ceramic layers 2 and constitute a coil conductor 30a.

Terminal electrodes 5 and 5 are formed on both ends of the chip body 4a in the Y-axis direction and are connected with ends of leading electrodes 6a located above and below in the Z-axis direction. The terminal electrodes 5 and 5 are connected with both ends of the coil conductor 30a forming a closed-magnetic-path coil.

In the present embodiment, the ceramic layers 2 and the internal electrode layers 3 are laminated in the Z-axis direction, and the end surfaces of the terminal electrodes 5 and 5 are parallel to the X-axis and the Z-axis. The X-axis, the Y-axis, and the Z-axis are perpendicular to each other. In the multilayer chip coil 1a shown in FIG. 2, the winding axis of the coil conductor 30a substantially corresponds to the Z-axis.

In the multilayer chip coil 1 shown in FIG. 1, the winding axis of the coil conductor 30 is in the Y-axis direction (the longitudinal direction of the chip body 4). Thus, compared to the multilayer chip coil 1a shown in FIG. 2, the multilayer chip coil 1 shown in FIG. 1 can have a large winding number and is advantageous in easy achievement of high impedance up to high frequency band. In the multilayer chip coil 1a shown in FIG. 2, other features and effects are similar to those of the multilayer chip coil 1 shown in FIG. 1.

The ferrite composition according to the present embodiment can be used for electronic components other than the multilayer chip coil shown in FIG. 1 or FIG. 2. For example, the ferrite composition according to the present embodiment can be used as ceramic layers laminated along with a coil conductor. In addition, the ferrite composition according to the present embodiment can be used for a composite electronic component formed by combining a coil, such as LC composite component, with other elements, such as capacitors.

The multilayer chip coil using the ferrite composition according to the present embodiment is used for any purposes, but is favorably used for, for example, a circuit where a winding-wire-type ferrite inductor is conventionally used so as to flow a particularly high AC current, such as a circuit of ICT devices (e.g., smart phones) using, for example, NFC technology.

EXAMPLES

Hereinafter, the present invention is explained based on more detailed examples, but is not limited to the following examples.

As raw materials of a main component, $Fe_2O_3$, NiO, CuO, and ZnO were prepared. As raw materials of a sub-component, $SiO_2$, $Bi_2O_3$, and $Co_3O_4$ were prepared. Incidentally, the starting raw materials had an average grain size of 0.05 to 1.00 μm.

Next, powders of the prepared raw materials of the main component and the sub-component were weighed to have the compositions shown in Table 1 as sintered bodies.

After the weighing, $Fe_2O_3$, NiO, CuO, and if necessary, a part of ZnO from the prepared raw materials of the main component were mixed in a wet manner in a ball mill for an appropriate time, and a raw material mixture was obtained. The amount of ZnO in the raw material mixture was one shown in Table 2. The amount of ZnO in the raw material mixture shown in Table 2 was one when the amount of the main component in the raw material mixture was 100 mol %.

Next, the obtained raw material mixture was dried and thereafter calcined in the air, and a calcined material was obtained. The calcination temperature was appropriately selected from 500 to 900° C. After that, the calcined material was added with $Zn_2SiO_4$ by the amount shown in Table 2 and was pulverized in a ball mill while being added with ZnO as necessary and further being added with other constituents of the sub-component. Then, a pulverized calcined material was obtained. The amount of $SiO_2$ is shown in Table 2. Incidentally, the amount of $Zn_2SiO_4$ and the amount of $SiO_2$ were ones when the entire calcined material was 100 wt %.

After the pulverized calcined material was dried, 100 parts by weight of the pulverized calcined material were added with 10.0 parts by weight of a polyvinyl alcohol aqueous solution (weight concentration: 6%) as a binder and were granulated to be granules. These granules were pressed to obtain a pressed body having a toroidal shape (size: outer diameter 13 mm×inner diameter 6 mm×height 3 mm) and a pressed body having a disk shape (size: outer diameter 12 mm×height 2 mm).

Next, the pressed bodies were fired in the air for two hours at the firing temperature (900° C.), and a toroidal core sample and a disk sample as sintered bodies were obtained. Moreover, the following characteristic evaluation was carried out for each of the obtained samples. Incidentally, an X-ray fluorescence analyzer confirmed that there was almost no change in composition between the weighed raw material powders and the fired pressed bodies.

Permeability μ'

A permeability μ' of the toroidal core sample was measured using an RF impedance material analyzer (E4991A manufactured by Agilent Technologies). As the measurement conditions, the measurement frequency was 10 MHz, and the measurement temperature was 25° C. A permeability μ' of 3.0 or more was considered to be favorable.

DC Superposition Characteristics

A copper wire was wound around the toroidal core sample by 30 turns, and a permeability μ' at application of DC current was measured using an LCR meter (4284A manufactured by HEWLETT PACKARD). As the measurement conditions, the measurement frequency was 1 MHz, and the measurement temperature was 25° C. The permeability was measured while the applied DC current was changed from 0 to 8 A and was graphed with the horizontal axis of DC current and the vertical axis of permeability. Then, an electric current value when the permeability decreased by 10% compared to 0 A of DC current was obtained as an Idc.

When the permeability decreased by 10% at 8 A or less (applied DC current), the DC current at 10% decrease in permeability was an Idc. When the permeability did not decrease by 10% at 8 A (applied DC current), an Idc was calculated from a gradient of the graph at 8 A (DC current).

Density

A density of the sintered ferrite composition was calculated from a size and a weight of the fired sintered body of the toroidal core sample.

Observation of Ferrite Composition

The sintered ferrite compositions (toroidal core samples) were observed by a STEM-EDS. The observation magnification was 20000 times or more and was appropriately determined depending on each of examples and comparative examples. Then, confirmed was whether or not each of the ferrite compositions contained a main-phase particle composed of spinel ferrite, a first sub-phase particle containing $Zn_2SiO_4$, a second sub-phase particle containing $SiO_2$, and a grain boundary containing $SiO_2$. Moreover, the area ratios of the main-phase particles, the first sub-phase particles, the second sub-phase particles, and the grain boundaries on a cross section of each of the ferrite compositions were calculated from the observation result by the STEM-EDS. In each example of Table 1 and Table 2 (Sample No. 1-1 and Sample No. 2-1), the first sub-phase particles had an area ratio of 35% or more and 65% or less, the second sub-phase particles had an area ratio of 3% or more and 5% or less, the main-phase particles had an area ratio of 30% or more and 61% or less, and the grain boundaries had an area ratio of 1% or more and 3% or less.

Moreover, a measurement area containing two to five main-phase particles was set, and all of the main-phase particles contained in this area underwent a line analysis by a STEM-EDS. Then, confirmed was whether there was a main-phase particle having a Zn concentration gradient decreasing from a particle surface toward a particle central part. In addition, a Zn element mapping image was made, and whether or not the main-phase particle contained a Zn core-shell was confirmed. Moreover, multiple measurement areas were determined by changing the location of the measurement areas, and whether or not there was a main-phase particle having a Zn concentration gradient was confirmed with respect to 10 or more main-phase particles in total. Then, a number ratio of the main-phase particles having a Zn concentration gradient was calculated. Likewise, a number ratio of the main-phase particles containing a Zn core shell was calculated. The results are shown in Table 2.

Moreover, A2/A1 was calculated, where A1 and A2 were a minimum value and a maximum value of ZnO concentrations in each of the main-phase particles. Specifically, all of the main-phase particles contained in this measurement area underwent a line analysis by a STEM-EDS. Then, A2/A1 was calculated in each of the main-phase particles having a Zn concentration gradient and was averaged. The results are shown in Table 2.

AC Resistance

As for an AC resistance (Rac), a copper wire was wound around the toroidal core sample on the primary side by six turns and on the secondary side by three turns. During the measurement, the measurement frequency was 3 MHz, and the AC current value was 1.6 Arms. A B-H analyzer (SY-8218 manufactured by IWATSU ELECTRIC CO., LTD.) and an amplifier (4101-IW manufactured by NF CORPORATION) were used.

TABLE 1

| Composition | Main Component (mol %) | | | | Sub-component (pts. wt.) | | |
| --- | --- | --- | --- | --- | --- | --- | --- |
| | Fe2O3 | NiO | CuO | ZnO | Co3O4 | SiO2 | Bi2O3 |
| Composition 1 | 33.68 | 18.46 | 4.92 | 42.93 | 1.00 | 11.25 | 1.00 |
| Composition 2 | 28.09 | 15.40 | 4.11 | 52.41 | 1.00 | 14.64 | 1.00 |

TABLE 2

| No. | Composition | Amount of ZnO in raw material mixture (mol %) | Amount of Zn2SiO4 added to calcined material (wt %) | Amount of SiO2 added to calcined material (wt %) | Presence of Zn concentration gradient | Number ratio of main-phase particles having Zn concentration gradient (%) | Presence of Zn core shell |
|---|---|---|---|---|---|---|---|
| 1-1 | Composition 1 | 5.00 | 60.00 | 0.00 | yes | 10 | yes |
| 1-2 | Composition 1 | 11.00 | 50.66 | 1.27 | no | 0 | no |
| 2-1 | Composition 2 | 5.00 | 90.00 | 0.00 | yes | 20 | yes |
| 2-2 | Composition 2 | 11.00 | 80.50 | 0.97 | no | 0 | no |

| No. | Composition | Number ratio of main-phase particles containing Zn core shell (%) | Total area ratio of first sub-phase particles and second sub-phase particles (%) | A2/A1 | Idc (A) | Density (g/cm$^3$) | μ' | Rac (mΩ) |
|---|---|---|---|---|---|---|---|---|
| 1-1 | Composition 1 | 10 | 38.0 | 2.50 | 14.1 | 4.66 | 5.49 | 12.1 |
| 1-2 | Composition 1 | 0 | 38.0 | 1.05 | 9.9 | 4.58 | 5.51 | 15.0 |
| 2-1 | Composition 2 | 20 | 56.4 | 1.80 | 18.3 | 4.61 | 4.49 | 10.2 |
| 2-2 | Composition 2 | 0 | 56.4 | 1.03 | 10.3 | 4.60 | 4.50 | 14.3 |

Sample No. 1-1 and Sample No. 1-2 shown in Table 1 and Table 2 were an example and a comparative example where the amount of ZnO in the raw material mixture, the amount of $Zn_2SiO_4$ added to the calcined material, and the amount of $SiO_2$ added to the calcined material were changed without changing the composition.

The main-phase particles of the ferrite composition of Sample No. 1-1 had a Zn concentration gradient decreasing from a particle surface toward a particle central part and further had a Zn core shell. On the other hand, the main-phase particles of the ferrite composition of Sample No. 1-2 did not have either a Zn concentration gradient decreasing from a particle surface toward a particle central part or a Zn core shell. As a result, the Idc of the ferrite composition of Sample No. 1-1 was 1.4 times larger than that of the ferrite composition of Sample No. 1-2, and the Rac of the ferrite composition of Sample No. 1-1 was 0.8 times larger than that of the ferrite composition of Sample No. 1-2. That is, compared to the ferrite composition of Sample No. 1-2, the ferrite composition of Sample No. 1-1 had high DC superposition characteristics and a low AC resistance.

Sample No. 2-1 and Sample No. 2-2 were an example and a comparative example whose composition was changed from that of Sample No. 1-1 and Sample No. 1-2.

The main-phase particles of the ferrite composition of Sample No. 2-1 had a Zn concentration gradient decreasing from a particle surface toward a particle central part and further had a Zn core shell. On the other hand, the main-phase particle of the ferrite composition of Sample No. 2-2 did not have either a Zn concentration gradient decreasing from a particle surface toward a particle central part or a Zn core shell. As a result, the Idc of the ferrite composition of Sample No. 2-1 was 1.8 times larger than that of the ferrite composition of Sample No. 2-2, and the Rac of the ferrite composition of Sample No. 2-1 was 0.7 times larger than that of the ferrite composition of Sample No. 2-2. That is, compared to the ferrite composition of Sample No. 2-2, the ferrite composition of Sample No. 2-1 had high DC superposition characteristics and a low AC resistance.

DESCRIPTION OF THE REFERENCE NUMERICAL 1, 1a . . . multilayer chip coil
2 . . . ceramic layer
3, 3a . . . internal electrode layer
4, 4a . . . chip body
5 . . . terminal electrode
6 . . . terminal-connection through hole electrode
6a . . . leading electrode
11 . . . ferrite composition
12 . . . main-phase particle
14a . . . first sub-phase particle
14b . . . second sub-phase particle
16 . . . grain boundary
30, 30a . . . coil conductor

What is claimed is:

1. A ferrite composition comprising main-phase particles composed of spinel ferrite, first sub-phase particles, second sub-phase particles, and a grain boundary, wherein
at least 10% or more of the main-phase particles contain a portion whose Zn concentrations monotonously decrease from a particle surface toward a particle central part along a length of 50 nm or more,
the first sub-phase particles contain $Zn_2SiO_4$,
the second sub-phase particles contain $SiO_2$, and
a total area ratio of the first sub-phase particles and the second sub-phase particles is 30.5% or more.

2. The ferrite composition according to claim 1, wherein an average of A2/A1 is 1.10 or more, where A1 and A2 are respectively a minimum value and a maximum value of Zn concentrations of the portion in each of the main-phase particles.

3. A ferrite composition comprising main-phase particles composed of spinel ferrite, first sub-phase particles, second sub-phase particles, and a grain boundary, wherein
at least 10% or more of the main-phase particles are composed of a core part and a shell part whose Zn concentration is higher than that of the core part,
the first sub-phase particles contain $Zn_2SiO_4$,
the second sub-phase particles contain $SiO_2$, and a total area ratio of the first sub-phase particles and the second sub-phase particles is 30.5% or more.

4. The ferrite composition according to claim 1, wherein the grain boundary contains $SiO_2$.

5. The ferrite composition according to claim 3, wherein the grain boundary contains $SiO_2$.

6. The ferrite composition according to claim 1, comprising a main component and a sub-component, wherein
the main component includes 10.0 to 50.0 mol % of a Fe compound in terms of $Fe_2O_3$, 3.0 to 14.0 mol % of a Cu compound in terms of CuO, 10.0 to 80.0 mol % of a Zn compound in terms of ZnO, and a balance of a Ni compound, and the sub-component includes 3.0 to 25.0 parts by weight of a Si compound in terms of $SiO_2$ with respect to 100 parts by weight of the main component.

7. The ferrite composition according to claim 3, comprising a main component and a sub-component, wherein
the main component includes 10.0 to 50.0 mol % of a Fe compound in terms of $Fe_2O_3$, 3.0 to 14.0 mol % of a Cu compound in terms of CuO, 10.0 to 80.0 mol % of a Zn compound in terms of ZnO, and a balance of a Ni compound, and
the sub-component includes 3.0 to 25.0 parts by weight of a Si compound in terms of $SiO_2$ with respect to 100 parts by weight of the main component.

8. A multilayer electronic component comprising conductor layers and ceramic layers,
wherein the ceramic layers are composed of the ferrite composition according to claim 1.

9. A multilayer electronic component comprising conductor layers and ceramic layers,
wherein the ceramic layers are composed of the ferrite composition according to claim 3.

* * * * *